United States Patent [19]

Matzelle

[11] 4,383,719
[45] May 17, 1983

[54] CONVEX BACK SLEEVE BEARING
[75] Inventor: Albert J. Matzelle, Brighton, Mich.
[73] Assignee: Federal-Mogul Corporation, Detroit, Mich.
[21] Appl. No.: 173,291
[22] Filed: Jul. 29, 1980
[51] Int. Cl.³ .............................................. F16C 33/04
[52] U.S. Cl. ................................... 384/282; 384/288; 384/397; 29/149.5 R
[58] Field of Search ................ 308/121, 23, 240, 179, 308/237 R, 63; 29/149.5 R

[56] References Cited
U.S. PATENT DOCUMENTS

| 2,997,347 | 8/1961 | Bauer | 308/23 |
| 4,235,481 | 11/1980 | Fukuoka et al. | 308/23 |
| 4,307,921 | 12/1981 | Roberts | 308/240 |
| 4,311,349 | 1/1982 | Roberts | 308/240 |

Primary Examiner—Lenard A. Footland
Attorney, Agent, or Firm—Robert F. Hess

[57] ABSTRACT

A journaled bearing assembly including a pair of semicircular half shells defining a sleeve bearing with an outer surface and an inner bearing surface with the surfaces extending axially between laterally spaced opposite ends and circumferentially between oppositely disposed parting faces with the bearing surface being concave and the outer surface being convex axially between the ends while in the free state and held at gage diameter. In the free state the terminal portions adjacent the parting faces are on a longer radius than the radius of the central portion. When held at gage diameter the terminal portions are on a radius equal to the radius of the central portion. The bearing sleeve is disposed in a bearing housing with the bearing surfaces in engagement with a journaled portion of a shaft. The bearing housing includes clamping members in clamping engagement with the outer surfaces of the half shells to apply radical forces to the half shells. These force the concave and convex surfaces into a substantially straight configuration axially between the ends thereof so that the stresses in the half shells are greatest along the circumferential center line and continuously decrease from the center line to the circumferential ends. This stress distribution causes the seating pressure between the bearing sleeve and the housing to be greatest along the circumferential center line of the outer surface of the bearing sleeve and continuously decrease to the portions of the outer surface adjacent the circumferential ends. The resulting pressure gradient allows any oil between the outer cylinderical surface of the bearing sleeve and the housing to follow the path of least resistance and flow from the circumferential center line out the ends from between the bearing sleeve and the housing. Thus, the protective coatings on the outer surface of the bearing which wears free and any build-up of oil oxides will be reduced by being continuously flushed out the ends of the bearing sleeve.

3 Claims, 8 Drawing Figures

CONVEX BACK SLEEVE BEARING

BACKGROUND OF THE INVENTION

1. Field of the Invention

This invention relates to a thin-wall plain sleeve bearing of the type having an oil film or layer between the bearing surface and a journaled member. The invention is particularly applicable to half-shell sleeve bearings used in internal combustion engines in cooperation with crank shafts and connecting rods. However, it will be appreciated that the invention has broader application and may be used in other environments of this general type, e.g., main bearings.

2. Description of the Prior Art

Sleeve bearings of the type to which the subject invention relate have a cylindrical outer surface or O.D. commonly called the bearing back which is disposed in a housing such as at the end of a connecting rod. Such sleeve bearings include an inner bearing surface in varying engagement with a journaled member such as a journaled portion of a crank shaft. The members forming the bearing housing are in clamping engagement with the bearing back to apply radial forces to the bearing back and the bearing assembly is continuously subjected to an oil supply for establishing a film of oil between the bearing surface and the journaled member.

The outer cylindrical surface defining the bearing back and the inner bearing surface in such sleeve bearings extend axially between opposite ends of the bearing and circumferentially 360° with the sleeve bearing being defined by two half shells having parting faces in abutting engagement with one another. Because of the various procedures used to manufacture the bearing half shells, the profile of the bearing back or outer cylindrical surface will be generally concave axially between opposite ends of the bearing. The amount of the concavity will vary from bearing to bearing as a result of the size of the bearing, the material thickness, etc.; however, the bearing back is basically always concave between the ends when the bearing is in the free state and when held to gage diameter, i.e., not clamped in a bearing housing. Further, the bearing backs normally include a very thin protective coating or plating, such as flash lead or tin.

SUMMARY OF THE INVENTION

Applicant has discovered that, when such prior art bearing sleeves are placed in a bearing housing and radial forces applied thereto, the axially spaced end portions of the bearing back surface are under a greater seating force or pressure with the housing as a result of the concavity of the bearing back being straightened than are the circumferential central portions of the bearing back. Applicant has also discovered that some oil finds its way between the bearing back and the housing, as by capillary action. It has further been discovered that, as a result of the bearings constantly experiencing a change in strain during operating conditions (due to dynamic loads, bearing housing distortion, etc.), the protective coatings on the bearing back rub free and flow to the areas of minimum back contact or minimum seating pressure between the bearing back and its housing. The oil between the bearing back and its housing also tends to move to these areas of minimum seating pressure and, therefore, cause a build-up of oil oxide and the bearing back protective coatings. This build-up of residue results in premature bearing distress and failure.

In accordance with the subject invention, there is provided a sleeve bearing wherein a significant portion of the oil and any bearing back plating which is rubbed free continuously flow from the circumferential center portion of the bearing back out the ends of the bearing reducing build-ups on the bearing back to thereby greatly increase the bearing life. The sleeve bearing comprises two half shells each of which is of a generally semicircular configuration and has an outer surface or bearing back and an inner bearing surface for engaging a journaled member. The surfaces extend axially between laterally spaced opposite ends and circumferentially between oppositely disposed parting faces. Each half shell is characterized by being bowed axally between the ends with the bearing surface being concave and the outer surface being convex while in the free state and when held at gage diameter. In the free state the terminal portions adjacent the parting faces are on a longer radius than the radius of the central portion. When held at gage diameter the terminal portions are on a radius equal to the radius of the central portion.

Thus, the surfaces remain concave and convex until placed in the bearing housing and radial forces are applied thereto to force the concave and convex surfaces into a substantially straight configuration axially between the ends thereof. The stresses in the half shells are greatest along the circumferential center line and continuously decrease from the center line to the axially spaced circumferential ends. This stress distribution causes the seating pressure between the bearing back and the housing to be greatest along the circumferential center line of the outer bearing back surface and continuously decreases to the portions of the outer surface adjacent the ends. This pressure gradient promotes flushing of the contaminants out the ends of the bearing, which contaminants would otherwise undesirably build up on the bearing back. The mechanism for the flow of oil and contaminants out the ends 24 of the bearing is dynamic (rather than static) in nature. During the operating cycle of the bearing (as in an engine) the dynamic loads imposed on the bearing change in a cyclical manner; consequently, the pressure gradient between the bearing back and the housing also changes. The pressure gradient will fluctuate above and below the static pressure gradient resulting in a "pumping action" which forces oil and contaminants to move toward and out the ends 24 of the bearing.

PRIOR ART STATEMENT

As discussed above, the prior art bearing backs are concave from side-to-side or end-to-end as a result of manufacturing techniques. Further, bearing half shells prior to being inserted into a bearing housing in their free state, have a greater diameter between the parting faces thereof than the bearing housing diameter and, therefore, the parting faces of a bearing sleeve must be moved together when inserting the sleeve into a bearing housing. It is a natural phenomenon that in so bending an elongated curved strip, the outside surface becomes concave between the side edges or, in the case of a bearing, the opposite ends. Thus, when such bearing sleeves are placed in the housing and clamped therein, the seating pressures are greater at the bearing ends than at the circumferential center line, facilitating the build-up of contaminants which cause bearing distress. There is a known bearing sleeve which has a convex bearing back between the ends of the bearing and which is illustrated in French Patent No. 905,627. However, in accordance with that bearing design, the bearing back is convex, but the inner bearing surface remains straight and when in the installed operating position, the bearing back remains convex, the purpose of which is to allow the shaft to move off an axial center line, i.e., to be oblique or askew relative to the axial center line of the bearing housing.

BRIEF DESCRIPTION OF THE DRAWINGS

Other advantages of the present invention will be readily appreciated as the same becomes better understood by reference to the following detailed description when considered in connection with the accompanying drawings wherein.

DESCRIPTION OF THE PREFERRED EMBODIMENT

Figure 1:
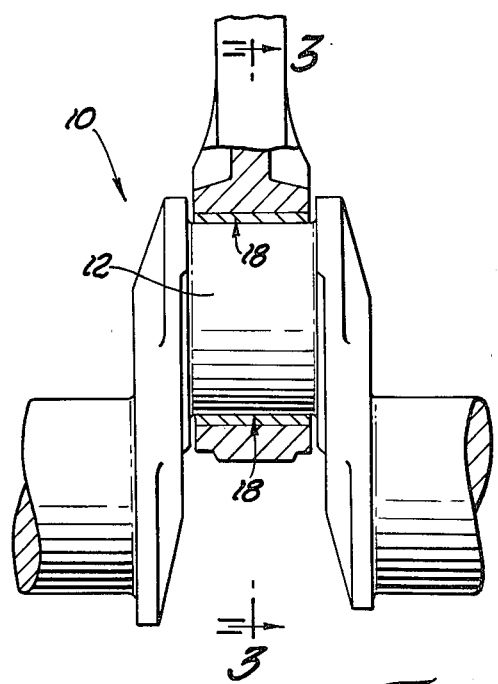
FIG. 1 shows a journaled bearing assembly incorporating the sleeve bearing of the subject invention.
Figure 2:
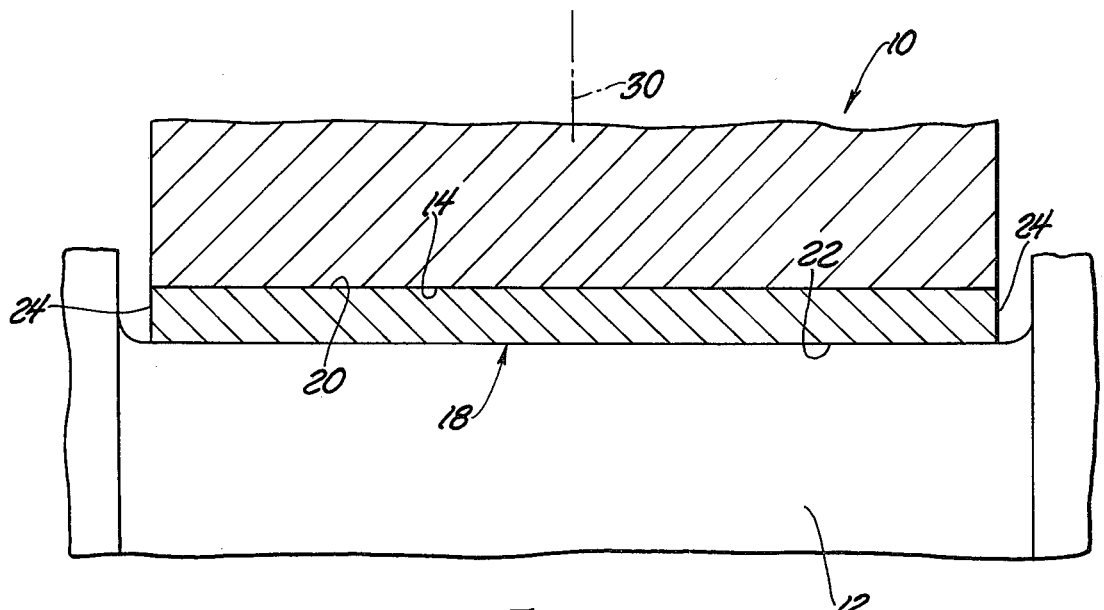
FIG. 2 is an enlarged fragmentary cross-sectional view of the assembly of FIG. 1.
Figure 3:
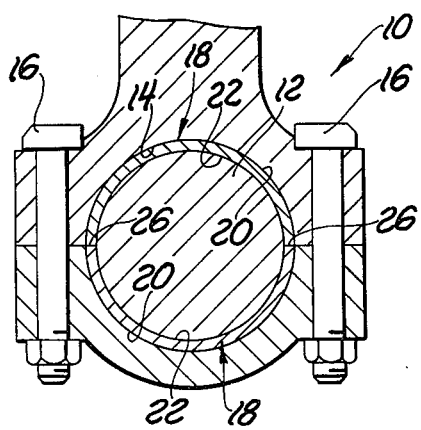
FIG. 3 is a cross-sectional view taken substantially along line 3—3 of FIG. 1.
Figure 4:
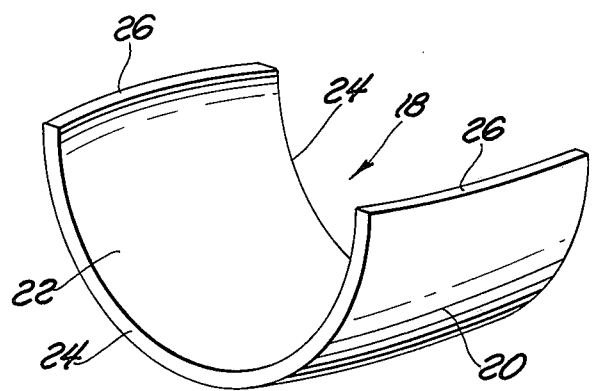
FIG. 4 is a perspective view showing a sleeve bearing half shell constructed in accordance with the subject invention.

A journaled bearing assembly including a pair of sleeve bearing half shells constructed in accordance with the subject invention is generally shown at 10 in FIGS. 1, 2 and 3.

The journaled bearing assembly 10 includes a crank shaft having a journaled portion 12 as is well-known in the art. There is also included a connecting rod having clamping means defining a bearing housing 14. The upper portion of the bearing housing is defined in the lower end of the connecting rod and the lower portion of the bearing housing is defined by the cap which, together with the bolts 16, define a clamping means.

The assembly 10 also includes a thin-wall plain sleeve bearing defined by the sleeve bearing half shells generally indicated and shown at 18 in all of the FIGURES.

Referring more particularly to FIGS. 4 through 8, each sleeve bearing half shell 18 is of a generally semicircular configuration and has an outer bearing back surface 20 and an inner bearing surface 22 for engaging the journaled member or portion 12 of the shaft. The surfaces 20 and 22 extend axially, i.e., along the central axis of the cylindrical or semispherical half shells 18, between laterally disposed or axially spaced opposite ends or sides 24. Each of the surfaces 20 and 22 are continuous and smooth between the ends 24. The surfaces 20 and 22 also extend circumferentially between the oppositely disposed parting faces 26. The half shell is bowed axially between the ends 24 with the bearing surface 22 being concave and the outer bearing back surface 20 being convex while in the free state as particularly illustrated in FIGS. 4, 5 and 6. The concave bearing surface 22 and the convex outer surface 20 extends from parting face 26 to parting face 26. In other words, the concave and convex surfaces extend a complete 180° between the opposite extremities of the half shell 18.

Figure 5:
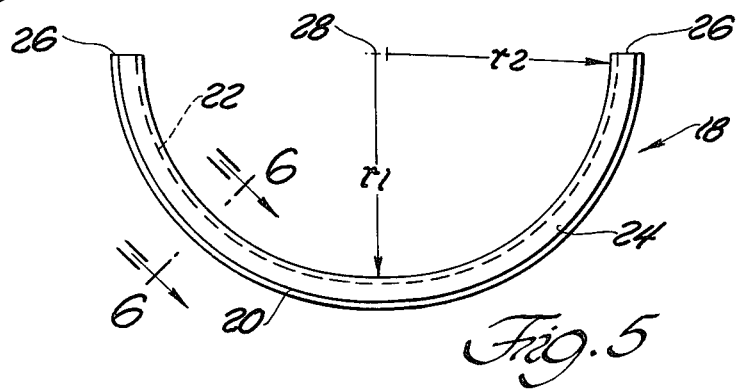
FIG. 5 is a side-elevational view of the sleeve bearing half shell shown in FIG. 4 in the free state.
Figure 6:
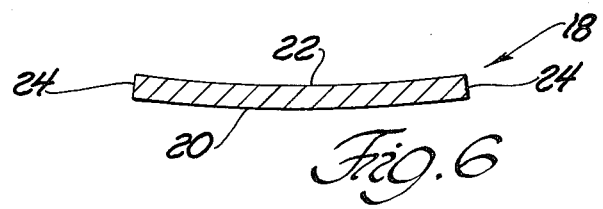
FIG. 6 is a cross-sectional view taken substantially along line 6—6 of FIG. 5.

As illustrated in FIG. 5, the half shell 18 extends about an axial imaginary center 28 and the terminal portions adjacent the parting faces 26 are on a longer radius $r_2$ from the axial center 28 than the radius $r_1$ of the central portion disposed centrally between the parting faces 26 while the half shell is in the free state, i.e., with no external forces applied thereto. It is normal that the portions of the half shell at the parting faces be spread apart in the free state and must be moved together for insertion into a bearing housing so that the half shell will tend to spring apart when in the bearing housing and frictionally be retained within the bearing housing.

Figure 7:
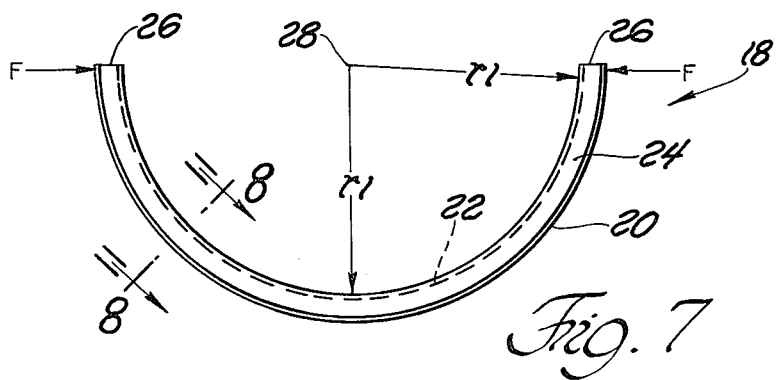
FIG. 7 is a side-elevational view of the half shell shown in FIGS. 4 and 5 with the parting faces moved radially inwardly from the free state.

As is known in the art, a sleeve bearing has a gage diameter and that is the diameter of the bore or bearing housing in which the bearing is to be disposed. FIG. 7 shows the bearing sleeve 18 in the gage diameter configuration. In other words, as illustrated in FIG. 7, the terminal portions adjacent the parting faces 26 have been moved together to a position where the terminal portions adjacent the parting faces 26 are on a radius $r_1$ equal to the radius of the central and remaining portions of the semicircular bearing sleeve 18. When the bearing sleeve is in the position illustrated in FIG. 7, the concave and convex surfaces 22 and 20 are less concave and less convex than when in the free state illustrated in FIG. 5, but remain concave and convex. Thus, when a pair of half shells 18 are disposed about a journaled member 12 with the parting faces 26 of one half shell abutting the parting faces 26 of the other half shell and the bearing surfaces 22 in engagement with the journaled member, but before the bolts 16 are tightened, the surfaces 20 and 22 remain convex and concave respectively.

However, when the bolts 16 are tightened to apply radial forces to the half shells 18, the concave and convex surfaces are forced into a substantially straight configuration axially between the ends 24 thereof as illustrated in FIG. 2. Consequently, the stresses in the half shells 18 are greatest along the circumferential center line 30 and continuously decrease from the center line 30 to the axially spaced circumferential portions adjacent the ends 24. This stress distribution causes the seating pressure between the bearing sleeve outer surfaces 20 and the housing 14 to be greatest along the circumferential center line 30 of the outer surface 20 and continuously decrease to the portions of the outer surface 20 adjacent the ends 24. Although the bearing sleeve will be substantially straight between the ends 24 as illustrated in FIG. 2, there will be greater bearing contact or radial forces between the outer surface 20 of the sleeve and the housing 14 at the central portion thereof than at the axially outwardly portions. Therefore, there is less seating pressure or contact pressure between the axially outward portions of the outer surface 20 and the housing than at the center portions. Consequently, any oil that might be between the outer surface 20 and the housing 14 is urged to follow the path of least resistance which would be axially outwardly from the center and out the ends 24 of the sleeve bearing because there is gradually less pressure between the outer surface 20 and the housing 14 in an axial direction. Therefore, a significant amount of undesirable contaminants will flow axially outwardly of the ends 24 between the outer surface of the bearing sleeve 20 and the housing 14 when the bearing is performing in its operating environment. The mechanism for the flow of oil and contaminants out the ends 24 of the bearing is dynamic (rather than static) in nature. During the operating cycle of the bearing (as in an engine) the dynamic loads imposed on the bearing change in a cyclical manner. Consequently, the pressure gradient between the bearing back and the housing also changes. The pressure gradient will fluctuate above and below the static pressure gradient resulting in a "pumping action" which forces oil and contaminants to move toward and out the ends 24 of the bearing.

The invention has been described in an illustrative manner, and it is to be understood tht the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

Figure 8:
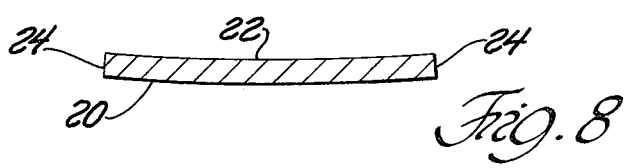
FIG. 8 is a cross-sectional view taken substantially along line 8—8 of FIG. 7.

The embodiments of the invention in which an exclusive property or privilege is claimed are defined as follows:

1. A sleeve bearing half shell (18) of a generally semicircular configuration and having an outer surface (20) and an inner bearing surface (22) for engaging a journaled member (12), said surfaces (20, 22) extending axially between laterally spaced opposite ends (24) and circumferentially between oppositely disposed parting faces (26), characterized by being bowed axially between said ends with said bearing surface (22) being concave and said outer surface (20) being convex while in the free state, said concave and convex surfaces (20, 22) extending from parting face (26) to parting face (26), said half shell (18) extending about an axial center (28) and the terminal portions adjacent said parting faces (26) being on a longer radius ($r_2$) from said axial center (28) than the radius ($r_1$) of the central portion between the parting faces (26) while in the free state (FIGS. 5 and 6), said concave and convex surfaces (20, 22) being less concave and less convex while remaining concave and convex when said terminal portions adjacent said parting faces (26) are moved together to a position where the terminal portions are on a radius ($r_1$) equal to the radius ($r_1$) of the central and remaining portions (FIGS. 7 and 8).

2. A journaled bearing assembly including a pair of said half shells (18) as set forth in claim 1, said assembly comprising; a shaft having a journaled portion (12), said pair of said half shells (18) defining a bearing sleeve disposed about said journaled portion (12) with said parting faces (26) of one half shell (18) abutting said parting faces (26) of the other half shell (18) and said bearing surfaces (22) in engagement with said journaled portion (12), clamping means having a bearing housing (14) in engagement with said outer surfaces (20) of said half shells (18) and applying radial forces to said half shells (18) to force said concave (22) and convex (20) surfaces of said half shells (18) into a substantially straight configuration (FIGS. 1 and 2) axially between said ends (24) thereof so that the stresses in said half shells (18) are greatest along the circumferential center line (30) and continuously decrease from the center line (30) to the axially spaced circumferential portions adjacent said ends (24) so that the seating pressure between said bearing sleeve and said housing (14) is greatest along the circumferential center line (30) of said outer surface (20) and continuously decreases to the portions of said outer surface (20) adjacent said ends (24).

3. A method of forming a journaled bearing assembly comprising the steps of; forming a pair of semicircular half shells (18) each with an outer surface (20) and an inner bearing surface (22) with the surfaces extending axially between laterally spaced opposite ends (24) and circumferentially between oppositely disposed parting faces (26) with the bearing surface (22) being concave and the outer surface (20) being convex axially between the ends (24) while in the free state, placing the half shells (18) together with the parting faces (26) abutting to define a bearing sleeve in a bearing housing (14) engaging the outer surfaces (20) thereof, and applying radial forces to the half shells (18) to force the concave (22) and convex (20) surfaces into a substantially straight configuration axially between the ends (24) thereof so that the stresses in the bearing sleeve are greatest along the circumferential center line (30) and continuously decrease from the center line (30) to the (24) so that the seating pressure between the bearing sleeve and the housing (24) are greatest along the circumferential center line (30) of the outer surface (20) and continuously decrease to the portions of the circumferential outer surface (20) adjacent the ends (24).

* * * * *

UNITED STATES PATENT AND TRADEMARK OFFICE
CERTIFICATE OF CORRECTION

PATENT NO. : 4,383,719
DATED : May 17, 1983
INVENTOR(S) : Albert J. Matzelle

It is certified that error appears in the above-identified patent and that said Letters Patent is hereby corrected as shown below:

Col. 2, line 16, "axally" should be --axially--

Col. 4, lines 48-49, "surfaces" should be --surface--

Col. 5, line 16, "tht" should be --that--

Col. 5, lines 46-47 (Claim 1), delete "(FIGS. 5 and 6)"

Col. 6, line 1 (Claim 1), "the" should be --said--

Col. 6, line 3 (Claim 1), delete "(FIGS. 7 and 8)"

Col. 6, line 17 (Claim 2), delete "(FIGS. 1 and 2)"

Col. 6, line 45 (Claim 3), after the word "the" (second occurrence) insert --ends--

Col. 6, line 47 (Claim 3), "(24)" should be --(14)--

Signed and Sealed this

Nineteenth Day of February 1985

[SEAL]

Attest:

DONALD J. QUIGG

Attesting Officer     Acting Commissioner of Patents and Trademarks